J. G. HARMAN.
REMOVABLE SAW HANDLE.
APPLICATION FILED AUG. 23, 1909.
950,390.
Patented Feb. 22, 1910.
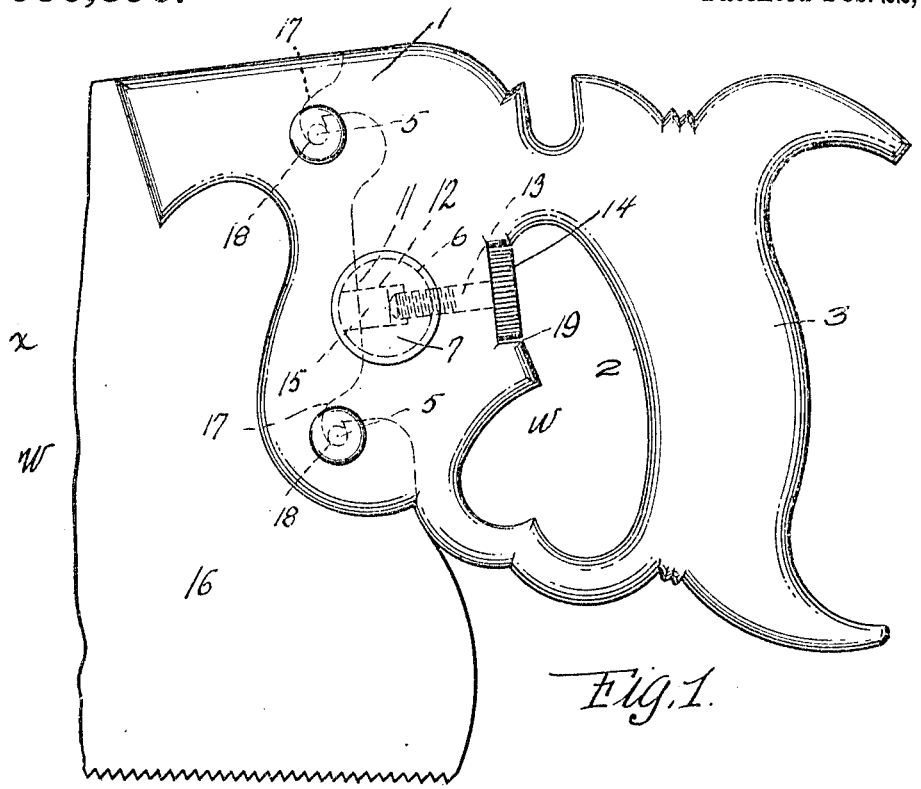
Fig. 1.
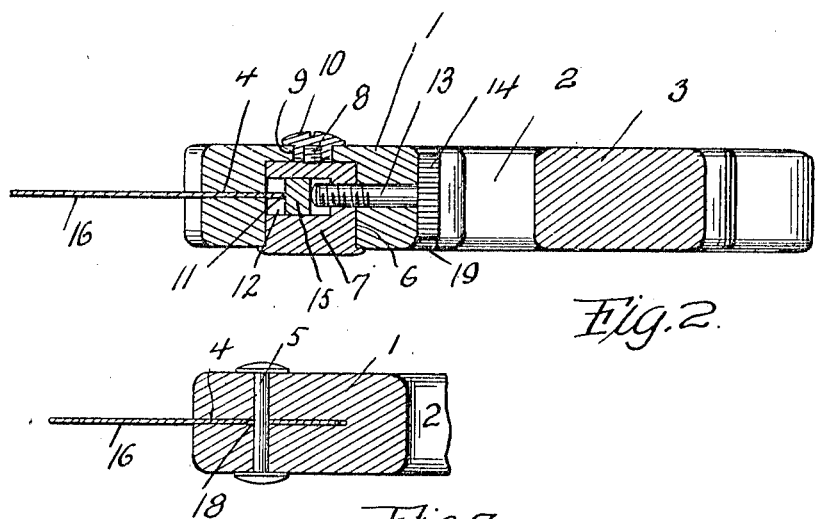
Fig. 2.
Fig. 3.
Witnesses
Samuel Payne.
R. H. Butler.
Inventor
J. G. Harman.
By A. C. Everett Co.
Attorneys.

UNITED STATES PATENT OFFICE.

JAMES G. HARMAN, OF PITTSBURG, PENNSYLVANIA.

REMOVABLE SAW-HANDLE.

950,390.  Specification of Letters Patent.  Patented Feb. 22, 1910.

Application filed August 23, 1909. Serial No. 514,192.

*To all whom it may concern:*

Be it known that I, JAMES G. HARMAN, a citizen of the United States of America, residing at Pittsburg, in the county of Allegheny and State of Pennsylvania, have invented certain new and useful Improvements in Removable Saw-Handles, of which the following is a specification, reference being had therein to the accompanying drawing.

This invention relates to saws, and the invention has for its object the provision of several effective means for detachably connecting a saw blade to a handle whereby either the blade or handle can be repaired or renewed should the same be injured or broken.

The above object is attained by using what is commonly known as a "bayonet shaped slot connection," and providing the handle of the saw with positive and reliable means for locking or maintaining the connection, thereby preventing the saw blade from becoming accidentally displaced relative to the handle when the saw is in use.

The invention will be hereinafter considered in detail and then claimed and reference will now be had to the drawing, wherein:—

Figure 1 is a side elevation of a portion of a saw constructed in accordance with my invention, Fig. 2 is a horizontal sectional view taken on the line X—X of Fig. 1, and Fig. 3 is a similar view taken on the line W—W of Fig. 1.

In the drawings 1 denotes the body of a saw handle, said body having an opening 2 providing a hand grip 3, similar to any ordinary saw handle. The body 1 is provided with a vertical slot or kerf 4 and with transverse pins 5 intersecting the slot or kerf 4. One side of the body 1 is provided with a transverse socket 6 having a plug 7 having the inner end thereof reduced to form an exteriorly threaded shank 8. The opposite side of the body 1 is provided with a transverse opening 9 communicating with the socket 6, and the opening 9 is adapted to receive a screw 10 which is screwed upon the shank 8 to hold the plug 7 within the socket 6. The plug 7 is provided with a vertical slot 11 and with a longitudinal recess 12, said slot 11 and the recess 12 communicating with the slot or kerf 4 of the handle body 1. Extending longitudinally of the body 1 and adjustably entering the plug 7 and the recess 12 thereof is a screw 13 having the outer end provided with a knurled head 14, while the inner end is adapted to bear against a block 15 arranged within the recess 12.

16 denotes a saw blade having the rear or large end thereof shaped to enter the slot or kerf 4, said saw blade having bayonet shaped or curved slots 17 providing slots 18 for the pins 5.

After the saw blade has been placed in the slot or kerf 4 with the pins 5 in the socket 18, the screw 13 is rotated to move the bearing plug 15 into engagement with the end of the saw blade 16, to bind said saw blade against the pins 5 and prevent accidental displacement of said blade. The forward wall of the opening 2 is recessed, as at 19 to provide clearance for the knurled head 14 of the screw 13.

It is thought that the utility of my invention is apparent without further description, and while in the drawing there is illustrated a preferred embodiment of the invention, it is to be understood that the structural elements thereof can be varied or changed without departing from the spirit of the invention.

Having now described my invention what I claim as new is:—

1. The combination of a saw handle having a vertical kerf, transverse pins arranged in said saw handle and adapted to intersect the kerf thereof, a plug mounted in said saw handle, said plug having a recess formed therein adapted to communicate with the kerf of said handle, a saw blade adapted to fit in the kerf of said handle, said blade having bayonet shaped slots adapted to receive the pins of said handle, a bearing block arranged within the recess of said plug, and a screw arranged in said handle and extending into said plug to hold said block in engagement with the end of said blade.

2. The combination of a saw handle having a vertical kerf formed therein, a blade adapted to fit in the kerf of said handle, a plug arranged in said handle, a bearing block arranged in said plug and adapted to bind the end of said blade within the kerf of said handle, and a screw adapted to enter said plug and bind said block against the end of said blade.

In testimony whereof I affix my signature in the presence of two witnesses.

JAMES G. HARMAN.

Witnesses:
 CHARLES A. MARTIN,
 P. T. SIEBERT.